2,832,714

RODENT REPELLENT METHODS AND COMPOSITIONS EMPLOYING NAPHTHENYL AMINES

Samuel E. Jolly, Ridley Park, Pa., assignor to Sun Oil Company, Philadelphia, Pa., a corporation of New Jersey No Drawing. Application August 31, 1953
Serial No. 377,671

15 Claims. (Cl. 167—32)

This invention relates to the protection of materials from attack by rodents.

The protection of packaged foods and other materials from attack by rodents is a highly important feature of various industries. The cost of goods destroyed or made unusable each year because of gnawing by rodents is presently quite high, and means of combating this destruction are very much in demand. Numerous "rodent repellent" chemicals have been proposed for the treatment of materials normally subject to attack by rodents. However, the requirements of a satisfactory rodent repellent are difficult to meet. The present invention provides a superior rodent repellency action and protection of materials by the use of certain derivatives of petroleum naphthenic acids.

According to the present invention, materials normally subject to attack by rodents are treated with a naphthenyl amine or an acid salt thereof. It has been found that such compounds are highly effective in preventing rodents from attacking materials which would otherwise be subject to being eaten or gnawed by rodents.

Naphthenyl amines are known in the art; they are compounds wherein one or more naphthenyl radicals, R— or $RCH_2$—, derived from petroleum naphthenic acids, RCOOH, is attached to a nitrogen atom. Naphthenyl amines wherein the naphthenyl radical is R— can be prepared in known manner by converting naphthenic acids RCOOH to naphthenyl amines having R directly attached to the nitrogen atom. Naphthenyl amines wherein the naphthenyl radical is $RCH_2$— can be prepared in known manner by converting naphthenic acids RCOOH to naphthenyl amines having R separated from the nitrogen atom by a methylene group. Preferred naphthenyl amines for use according to the invention are those having the formula:

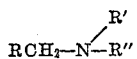

where R' and R" are each selected from the group consisting of hydrogen, naphthenyl ($RCH_2$), aliphatic, haloaliphatic, cycloaliphatic, araliphatic, hydroxyaliphatic, carboxylaliphatic, aminoaliphatic, and amidoaliphatic radicals, and where R' and R" each have molecular weight not greater than 300. R' and R" may be the same or different radicals; they may be straight or branched chain, saturated or unsaturated (containing one or more double bonds) radicals; saturated radicals are preferred; preferably each such radical has not more than 25 carbon atoms.

Naphthenyl amines may be prepared from naphthenic acids by any suitable method. One such method involves the reaction of ammonia with naphthenic acids to form the corresponding nitrile, RCN, and the reduction of the nitrile to the amine by means of metallic sodium. The nitrile may alternatively be reduced to the amine by known methods for reaction of hydrogen with the nitrile. In the reduction by means of metallic sodium, it is believed that mainly primary amines are obtained. In the hydrogenation method, it is believed that secondary and tertiary amines are also obtained in substantial amount. If desired, suitable known means for separating primary, secondary, and tertiary amines can be employed.

Secondary and tertiary amines can be prepared from primary amines by reacting the latter in known manner with a halide or sulfate of the radical which is to replace one or more of the hydrogens attached to the nitrogen atom, or by condensing and reducing the primary amine with an aldehyde or ketone.

Any suitable petroleum naphthenic acids can be used to prepare compounds according to the invention. Relatively high molecular weight naphthenic acids, having saponification number for example within the range from 120 to 200 mg. of KOH per gram, are used to advantage, but lower molecular weight acids, having saponification number for example within the range from 200 to 320, can also be used.

Naphthenyl amines can be employed according to the invention either as the free naphthenyl amine or in the form of their salts, either with organic or inorganic acids, e. g. hydrochloric acid, sulfuric acid, propionic acid, oxalic acid, maleic acid, oleic acid, abietic acid, phosphoric acid, petroleum sulfonic acid, naphthenic acid, rosin, phenylacetic acid, benzoic acid, picric acid, thiocyanic acid, nicotinic acid, etc. Preferred salts are the hydrochloric acid and picric acid salts.

Naphthenyl amines for use according to the invention include quaternary salts, which may be formed for example from a tertiary amine by addition of a suitable compound, e. g. cetyl bromide salt.

Naphthenyl amines for use according to the invention include polyamines as well as amines containing only one nitrogen atom.

Examples of naphthenyl amines for use according to the invention are the following: mononaphthenyl amine, mononaphthenyl diethyl amine, dinaphthenyl amine, trinaphthenyl amine, mononaphthenyl monomethyl amine, dinaphthenyl monobutyl amine, mononaphthenyl monohexenyl amine, mononaphthenyl monoeicosyl amine, tetranaphthenyl ammonium chloride, dinaphthenyl dioctadecyl ammonium acetate, mononaphthenyl mono(hydroxyethyl) amine, mononaphthenyl di(hydroxydecenyl) amine, dinaphthenyl mono(aminopropyl) amine, mononaphthenyl monobenzyl amine, mononaphthenyl mono(phenyloctyl) amine, mononaphthenyl di(cyclohexylmethyl) amine, mononaphthenyl di(cyclohexyldecyl) amine, dinaphthenyl mono(chloromethyl) amine, mononaphthenyl mono(acetamidoethyl) amine, mononaphthenyl di(acetyloxymethyl) amine, N-naphthenyl ethylene diamine.

Also constituting examples of compounds for use according to the invention are the salts, e. g. hydrohalide, sulfate, oxalate, oleate, etc. of each of the above primary, secondary, or tertiary amines.

Various means can be employed for applying naphthenyl amines to materials for protection against rodents. The amine can be deposited on an article to be protected by applying an aqueous solution of a water-soluble salt of the amine, e. g. a hydrohalide salt. Or the free amine can be dispersed in water with the aid of a wetting or dispersing agent and the dispersion applied to the article to be protected. Known types of adhesive or sticking agents may be added to the solution or dispersion to prevent the repellent from being removed by rain or other forms of moisture.

The naphthenyl amines can be incorporated in coating materials such as paraffin or microcrystalline wax, and the wax composition applied to the article to be protected, e. g. a paper package. The amines can be incorporated in plastic coating and film forming materials or in paper pulp, or can be deposited on fibers from which bags are to be made, and the amine-containing composition can then be made up into packaging means. The amines can also be mixed with suitable dry porous diluents such as clays, talc, and the like and employed as dusts to protect stored goods. The amount of amine or salt which is used as rodent repellent will generally be within the range from 0.01 to 5.0 percent based on the weight of the material to which the amine or salt is applied.

The following examples illustrate the invention:

*Example 1*

A naphthenyl amine was tested as a rodent repellent in a food acceptance test. The method of test used was essentially the same as that described in an article entitled "Rat Deterrents for Paper Packages" by Jack F. Welch, James B. De Witt, and Ervin Bellack in the April, May 1950 issue of Soap and Sanitary Chemicals. In this test, a repellency index K is determined as described in the article, which index indicates the extent to which the rodents used in the test are deterred from eating their normal food by admixing 2% of the test compound, naphthenyl amine in this case, with the food. The highest possible repellency index, K, is 100, which indicates very good rodent repellency. Low repellency indexes indicate poor rodent repellency or possibly even attraction for rodents. Some compounds are reported by the authors of the above-mentioned journal article to have repellency index as low as −275.

The naphthenyl amine tested was prepared as follows: Petroleum naphthenic acids having saponification number of 181 mg. of KOH per gram, indicating average molecular weight of 310, were heated to 250–300° C. and anhydrous ammonia was passed through the acids at that temperature until the evolution of water substantially ceased. The product was vacuum distilled to obtain a distillate comprising the naphthenic acid nitrile. 200 grams of molten sodium were admixed with 500 cc. of toluene, and one mole of the nitrile prepared as described above, dissolved in 500 cc. of n-butyl alcohol, were added slowly with stirring. The heat evolved caused violent boiling, and the reaction mixture was maintained under reflux conditions. 900 cc. of additional butyl alcohol were added slowly and the reaction mixture was refluxed for four hours. More toluene was added from time to time to maintain a suitably low viscosity. The reaction products were washed with water to remove sodium hydroxide formed. Then the alcohol and toluene were stripped off to obtain a residue containing the naphthenyl amine. Acetic acid was added to the residue to form the amine acetate. The residue was then dissolved in isopropanol and extracted with naphtha to remove the nitrile. The amine acetate was then neutralized with caustic soda to liberate the amine. The aqueous layer was separated, and isopropanol stripped from the amine. The amine was distilled under vacuum to obtain a distillate having a boiling range approximating 300–500° F. at 5 mm. Hg. This amine had an HCl equivalent of 124 mg. of HCl per gram, indicating an average molecular weight of about 294, as compared with the theoretical molecular weight of 295 for the primary amine. The close correspondence of these molecular weights indicates that predominantly the primary amine was obtained.

The naphthenyl amine prepared as described above was tested as a rodent repellent in the manner indicated previously, 20 grams of rat food containing 2% by weight of the naphthenyl amine being placed in a cage with a rat. The amine-containing food was in one cup and 20 grams of untreated rat food in another cup. Over a four-day period, the respective amounts eaten of treated and untreated food were measured daily, and a repellency index, K, was calculated from the observed data in the manner previously indicated. The following table shows the amounts of untreated and treated food eaten in the indicated periods:

| Time in Days | Amount Eaten in Grams (Cumulative) | |
|---|---|---|
| | Untreated Food | Treated Food |
| 1 | 14.3 | 0.0 |
| 2 | 19.3 | 0.3 |
| 3 | 20.0 | 1.3 |
| 4 | | 2.0 |

From these data, a repellency index of 95.6 for the naphthenyl amine was calculated.

In additional runs, a repellency index of 98.9 was determined for the same naphthenyl amine when used in 2% by weight concentration; repellency indexes of 96.7 and 95.3 were determined for the same naphthenyl amine when used in 1% by weight and 0.5% by weight concentrations respectively.

This example shows that naphthenyl amines are superior rodent repellents.

*Example 2*

The hydrochloric salt of the naphthenyl amine prepared as described in Example 1 was tested as a rodent repellent in the same manner as described in Example 1. The following table shows the results obtained using the naphthenyl amine hydrochloride in 1 wt. percent concentration:

| Time in Days | Amount Eaten in Grams (Cumulative) | |
|---|---|---|
| | Untreated Food | Treated Food |
| 1 | 20.0 | 0.0 |
| 2 | | 0.3 |
| 3 | | 0.7 |
| 4 | | 4.3 |

From these data, a repellency index of 97.2 was calculated.

In addition runs, repellency indexes of 95.7 and 80.5 were determined for the same naphthenyl amine hydrochloride when used in 2% by weight concentration; a repellency index of 98.6 was determined for the same naphthenyl amine hydrochloride when used in 0.5% by weight concentration.

This example shows that naphthenyl amine hydrochlorides are superior rodent repellents.

*Example 3*

The picric acid salt of the napthenyl amine prepared as described in Example 1 was tested as a rodent repellent in the same manner as described in Example 1. The following table shows the results obtained using the naphthenyl amine picrate in 2% by weight concentration:

| Time in Days | Amount Eaten in Grams (Cumulative) | |
|---|---|---|
| | Untreated Food | Treated Food |
| 1 | 18.7 | 0.0 |
| 2 | 20.0 | 1.3 |
| 3 | | 1.7 |
| 4 | | 2.0 |

From these data, a repellency index of 92.4 was calculated.

In additional runs, repellency indexes of 89.8, 97.2 and 92.4 were determined for the same naphthenyl amine picrate in 2% by weight, 1% by weight and 0.5% by weight concentration respectively.

This example shows that naphthenyl amine picrates are superior rodent repellents.

In the preceding examples, naturally occurring petroleum naphthenic acids were used to prepare the derivatives used as rodent repellents. Similar results may be obtained employing, instead of such naturally occurring acids, carboxylic acids obtained by partial oxidation of petroleum hydrocarbon fractions containing substantial quantities, e. g. at least a major proportion of naphthenic hydrocarbons. The term, petroleum naphthenic acids, as used herein, is to be considered as including acids obtained by such partial oxidation as well as naturally occurring acids. Typical oxidation conditions which may be employed in partial oxidation include: temperature 200° F. to 300° F., pressure atmospheric to 500 p. s. i. g., oxidizing agent air, oxygen, ozone, ozonized air, $H_2O_2$, etc., catalyst, if any, of the well known metal oxidation catalyst type, e. g. manganese naphthenate, etc.

The invention claimed is:

1. Method for protecting materials normally subject to attack by rodents which comprises: applying to said materials a rodent repellent composition selected from the group consisting of naphthenyl amines and acid salts thereof, said composition being present in a rodent repellent concentration.

2. A material normally subject to attack by rodents, said material having uniformly incorporated therein a rodent repellent composition selected from the group consisting of naphthenyl amines and acid salts thereof, said composition being present in a rodent repellent concentration.

3. A packaging material normally subject to attack by rodents impregnated with a rodent repellent composition selected from the group consisting of naphthenyl amines and acid salts thereof, said composition being present in a rodent repellent concentration.

4. A material normally subject to attack by rodents, said material having naphthenyl amines uniformly incorporated therein, which naphthenyl amines are prepared by converting petroleum naphthenic acids having the formula RCOOH to naphthenyl amines having the formula $RCH_2NH_2$, R being a naphthenyl radical to which a carboxyl group is attached in petroleum naphthenic acids, said naphthenyl amines being present in a rodent repellent concentration.

5. A material normally subject to attack by rodents and selected from the group consisting of paper and textile materials, said material having naphthenyl amines uniformly incorporated therein, which naphthenyl amines are prepared by converting petroleum naphthenic acids having the formula RCOOH to naphthenyl amines having the formula $RCH_2NH_2$, R being a naphthenyl radical to which a carboxyl group is attached in petroleum naphthenic acids, said naphthenyl amines being present in a rodent repellent concentration.

6. A material normally subject to attack by rodents, said material having hydrochloric acid salts of naphthenyl amines uniformly incorporated therein, which salts are prepared by converting petroleum naphthenic acids having the formula RCOOH to naphthenyl amines having the formula $RCH_2NH_2$, R being a naphthenyl radical to which a carboxyl group is attached in petroleum naphthenic acids, said salts being present in a rodent repellent concentration.

7. A material normally subject to attack by rodents, said material having picric acid salts of naphthenyl amines uniformly incorporated therein, which salts are prepared by converting petroleum naphthenic acids having the formula RCOOH to naphthenyl amines having the formula $RCH_2NH_2$, R being a naphthenyl radical to which a carboxyl group is attached in petroleum naphthenic acids, said salts being present in a rodent repellent concentration.

8. A paper packaging material normally subject to attack by rodents, said material having uniformly incorporated therein wax and a rodent repellent composition selected from the group consisting of naphthenyl amines and acid salts thereof, said composition being present in a rodent repellent concentration.

9. A composition comprising paper having uniformly incorporated therein a rodent repellent composition selected from the group consisting of naphthenyl amines and acid salts thereof, said rodent repellent composition being present in a rodent repellent concentration.

10. A textile fibre impregnated with a rodent repellent composition selected from the group consisting of naphthenyl amines and acid salts thereof, said composition being present in a rodent repellent concentration.

11. Method for protecting porous materials normally subject to attack by rodents which comprises applying to such materials an aqueous dispersion of a rodent repellent composition selected from the group consisting of naphthenyl amines and acid salts thereof, said composition being present in a rodent repellent concentration.

12. Method for protection of stored goods which comprises applying to stored goods normally subject to attack by rodents a dusting composition comprising a dry porous diluent and a rodent repellent composition selected from the group consisting of naphthenyl amines and acid salts thereof, said rodent repellent composition being present in a rodent repellent concentration.

13. Method according to claim 12 wherein said dry porous diluent is selected from the group consisting of clay and talc.

14. Method according to claim 1 wherein said composition contains water-soluble acid salts of naphthenyl amines and is applied as an aqueous solution.

15. Method according to claim 1 wherein said composition is applied as the sole agent for preventing damage by organisms.

References Cited in the file of this patent

UNITED STATES PATENTS 2,612,477     Mitchell _____ Sept. 30, 1952

OTHER REFERENCES

De Witt: Journal of the American Pharmaceutical Association, November 1953, pp. 695–697.